(12) United States Patent
Yeung et al.

(10) Patent No.: US 7,970,224 B2
(45) Date of Patent: Jun. 28, 2011

(54) EFFICIENT RATE ALLOCATION FOR MULTI-RESOLUTION CODING OF DATA

(75) Inventors: Yick Ming Yeung, Hong Kong (CN); Oscar Chi-Lim Au, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 12/638,225

(22) Filed: Dec. 15, 2009

(65) Prior Publication Data
US 2010/0150463 A1 Jun. 17, 2010

Related U.S. Application Data

(62) Division of application No. 10/790,234, filed on Mar. 2, 2004, now Pat. No. 7,672,523.

(60) Provisional application No. 60/450,692, filed on Mar. 3, 2003.

(51) Int. Cl.
*G06K 9/36* (2006.01)
*G06K 9/46* (2006.01)

(52) U.S. Cl. ......... 382/239; 382/232; 382/234; 382/240

(58) Field of Classification Search .................. 382/239, 382/232, 234, 240
See application file for complete search history.

(56) References Cited

U.S. PATENT DOCUMENTS

| | | | |
|---|---|---|---|
| 5,691,770 A | 11/1997 | Keesman et al. | |
| 5,734,755 A | 3/1998 | Ramchandran et al. | |
| 6,625,321 B1 | 9/2003 | Li et al. | |
| 6,760,482 B1 | 7/2004 | Taubman | |
| 7,672,523 B2 | 3/2010 | Yeung et al. | |
| 2006/0008162 A1 | 1/2006 | Chen et al. | |

OTHER PUBLICATIONS

Yeung, Y.M.—"An efficient optimal rate control scheme for JPEG2000 image coding"—IEEE—Sep. 2003, pp. 761-764.*
Yeung, Y.M.—"Efficient rate control technique for JPEG2000 image coding using priority scanning"—IEEE—Jul. 2003, pp. 277-280.*
Office Action, mailed Jul. 25, 2008, for U.S. Appl. No. 10/790,234, 23 pages.
Final Office Action, mailed Jan. 14, 2009, for U.S. Appl. No. 10/790,234, 15 pages.

(Continued)

*Primary Examiner* — Bhavesh M Mehta
*Assistant Examiner* — Bernard Krasnic
(74) *Attorney, Agent, or Firm* — Schwabe, Williamson & Wyatt, P.C.

(57) ABSTRACT

A method and an apparatus relates to examining respective collections of coefficients out of a plurality of collections of coefficients according to a global coding order of the plurality of collections of coefficients, the respective collections of coefficients having respective priority levels as well as respective pluralities of coding units and truncation points which correspond to the coding units. In response to determining that an examined collection of coefficients out of the plurality of collections of coefficients has a priority level equal to a global priority level, encoding a first un-encoded coding unit according to a local coding order of the collection of coefficients and reducing the priority level of the collection of coefficients; and after each of the collections of coefficients in the plurality are examined, decreasing the global priority level. Repeating the examining, the encoding, the reducing and the decreasing for the plurality of collections of coefficients, and terminating the examining, the encoding, the reducing, and the decreasing in response to determining that a total amount of bits used is greater than a target bit rate.

21 Claims, 3 Drawing Sheets

OTHER PUBLICATIONS

Notice of Allowability, mailed Jun. 18, 2009, for U.S. Appl. No. 10/790,234, 13 pages.

Notice of Allowability, mailed Oct. 20. 2009, for U.S. Appl. No. 10/790,234, 5 pages.

M. D. Adams, "JasPer project home page," http://www.ece.uvic.ca/~mdadams/jasper, 2000, 5 pages.

K. F. Chen, C. J. Lian, H. H. Chen and L. G. Chen, "Analysis and Architecture Design of EBCOT for JPEG-2000," IEEE Int. Sym. Of Circuits and Systems, vol. 2, pp. 765-768, May 2001.

C. Christopoulos, et al., "The JPEG2000 Still Image Codying System: An Overview," IEEE Trans. On Consumer Electronics, vol. 46, No. 4, Nov. 2000, 25 pages.

G. K. Wallace, "The JPEG Still Picture Compression Standard," IEEE Trans on Consumer Electronics, vol. 38, No. 1, Feb. 1992, 17 pages.

D. Taubman, "High Performance Scalable Image Compression with EBCOT," IEEE Trans on Image Processing, vol. 9, No. 7, Jul. 2000, 13 pages.

H. Everett, "Generalized Lagrange Multiplier Method for Solving Problems of Optimum Allocation of Resources," Oper. Res., avol. 11, pp. 399-417, 1963.

J. H. Kasner, M. W. Marcellin and B. R. Hunt, "Universal Trellis Coded Quantization," IEEE Trans. On Image Processing, vol. 8, No. 12, pp. 1677-1687, Dec. 1999.

T. Masuzaki, et al., "JPEG2000 Adaptive Rate Control for Embedded Systems," Proc. IEEE Int. Sym. On Circuits and Systems, vol. 4, pp. 333-336, May 2002.

J. W. Woods, J. Naveen, "A Filter Based Bit Allocation Scheme for Subband Compression of HDTV," IEEE Trans. on Image Processing, vol. 1, No. 3, pp. 436-440, Jul. 1992.

J. M. Shapiro, "Embedded Image Coding using Zerotrees of Wavelet Coefficients," IEEE Trans. on Signal Processing, vol. 41, No. 12, pp. 3445-3462 Dec. 1993.

A. Said, W. A. Pearlman, "A New, Fast, and Efficient Image Codec Based on Set Partitioning in Hierarchical Tress," IEEE Trans. On Circuits and Systems for Video Tech., vol. 6, No. 3, pp. 243-250, Jun. 1996.

M. D. Adams and F. Kossentini, "JasPer: A Software-based JPEG-2000 Codec Implementation," Proc. IEEE Int. Conf. on Image Processing, vol. 2, pp. 53-56, Oct. 2000.

* cited by examiner

EFFICIENT RATE ALLOCATION FOR MULTI-RESOLUTION CODING OF DATA

CROSS REFERENCE TO RELATED APPLICATIONS

This is a divisional application of U.S. application Ser. No. 10/790,234 filed Mar. 2, 2004, now issued as U.S. Pat. No. 7,672,523, and entitled "Efficient Rate Allocation for Multi-resolution Coding of Data," which claims the benefit of U.S. Provisional Application No. 60/450,692, filed Mar. 3, 2003.

FIELD OF THE INVENTION

This invention relates generally to digital signal compression, coding and representation, and more particularly to an image compression, coding and representation system using rate control or rate allocation and having both device and method aspects. It further relates to a computer program product, such as a recording medium, carrying program instructions readable by a computing device to cause the computing device to carry out a method according to the invention.

BACKGROUND OF THE INVENTION AND PRIOR ART

Due to the huge size of the raw data of digital signals, compression must be applied to the raw signals so that they may be transmitted and stored. The digital signals can be video, image, graphics, audio, speech, etc. In particular, digital image signals can be very large in size. Digital cameras can be used to capture high resolution images that can easily have a resolution of 10 megapixels or higher. Many remote sensing images or map images can have very high resolution as well. Image compression is very important for the storage, transmission and representation of such digital images.

One important international standard for image compression is the ISO/IEC 10918 standard, known commonly as the JPEG (Joint Photographic Experts Group) standard [G. K. Wallace, "The JPEG Still Picture Compression Standard," *IEEE Trans. On Consumer Electronics*, vol. 38, no. 1, February 1992.]. The JPEG standard was finished in early 1990s and has since been used widely in internet and digital cameras. In the year 2000, ISO/IEC produced a new standard ISO/IEC 15444, known commonly as the JPEG2000 standard [ISO/IEC, ISO/IEC 15444-1: *Information technology-JPEG 2000 image coding system-Part* 1 Core coding system, 2000: ISO/IEC, ISO/IEC 15444-2: *Information technology-JPEG 2000 image coding system-Part* 2: *Extensions,* 2000:C. Christopoulos, et. al., "The JPEG2000 Still Image Coding System: An Overview," *IEEE Trans. on Consumer Electronics*, vol. 46, no. 4, November 2000.], which can give both objective and subjective image quality superior to JPEG.

Baseline JPEG uses mainly discrete cosine transform (DCT), scalar quantization and variable length coding such as runlength coding, Huffman coding and arithmetic coding. On the other hand, JPEG2000 comprises discrete wavelet transform (DWT), scalar quantization, combined bit plane and arithmetic coding, and optimal rate control. Rate control or rate allocation is an algorithm or strategy to control the bit-rate of the signal coding such that it meets the target bandwidth, end-to-end delay and/or storage requirement. The ultimate target of rate control is to allocate the target bit-rate in the encoding of the signal such that the overall distortion can be minimized. In JPEG, the bit-rate is controlled by a single global value of quantization factor (or quality factor). As a result, the bit rate control is not accurate and the visual quality may vary from one region of the image to another. By using the bitplane coding, JPEG2000 can control the bit-rate to meet the bit-rate requirement precisely and easily. And the bit rate is controlled locally and thus can be adapted to the local image characteristics.

The basic encoding algorithm of JPEG2000 is based on *Embedded Block Coding with Optimized Truncation* or EBCOT [D. Taubman, "High Performance Scalable Image Compression with EBCOT," *IEEE Trans. on Image Processing*, vol. 9, no. 7, July 2000.]. The EBCOT algorithm partitions the wavelet coefficient into non-overlapped rectangle blocks called code-blocks. The code-block data are then entropy encoded by bit-plane coding. A rate-distortion optimization (optimal bit allocation) process is applied after all the quantized wavelet coefficients have been entropy encoded (compressed) and is referred to as post-compression rate-distortion (PCRD) optimization [D. Taubman, "High Performance Scalable Image Compression with EBCOT," *IEEE Trans. on Image Processing*, vol. 9, no. 7, July 2000: H. Everett, "Generalized Lagrange Multiplier Method for Solving Problems of Optimum Allocation of Resources," *Oper. Res.*, vol. 11, pp. 399-417, 1963.]. By utilizing the actual rate-distortion functions of all compressed data, the PCRD technique achieves minimum image distortion for any given bit-rate. However, since it requires the encoding of all the data and the storage of all the encoded bit-stream even though a large portion of the data needs not to be sent out, most of the computation and memory usage could be redundant in this process. Also the PCRD is an off-line process such that the whole image needs to be completely encoded before sending out any data and hence long delay is possible.

Another technique for the optimal rate allocation of JPEG2000 is by coefficients modelling. Kasner et al. [J. H. Kasner, M. W. Marcellin and B. R. Hunt, "Universal Trellis Coded Quantization," *IEEE Trans. on Image Processing*, vol. 8, no. 12, pp. 1677-1687, December 1999.] assumed 'that the wavelet coefficients could be modelled by memory-less generalized-Gaussian density (GGD). By estimating the GGD parameter, the rate-distortion function can be approximated as required for the optimal rate allocation. This approach is included in Part-2 of JPEG2000 [ISO/IEC, ISO/IEC 15444-2: *Information technology-JPEG* 2000 *image coding system-Part* 2: *Extensions,* 2000.] and is called Lagrangian rate allocation (LRA). In this approach, both the rate and distortion are estimated before actually encoding the wavelet coefficients. A quantization step-size of each sub-band is selected based on the estimation and the quantized wavelet coefficients are encoded without any truncation. This approach does not have the issue of redundant computation cost and redundant memory usage. However the rate control accuracy is heavily depended on the coefficients following the assumption of GGD. An iterative technique is often required to converge on the target bitrate. In each iteration, the quantization step-sizes are required to be re-estimated and the wavelet coefficients are thus quantized and entropy encoded again. The multiple quantization and entropy encoding processes heavily increase the complexity of this approach. In practice, the complexity of LRA is comparable to the PCRD approach.

Other than the empirical PCRD approach and the analytical LRA approach, Masuzaki et. al. [T. Masuzaki, et. al., "JPEG2000 Adaptive Rate Control for Embedded Systems," *Proc. IEEE Int. Sym. on Circuits and Systems*, vol. 4, pp. 333-336, May 2002.] first proposed a non-optimal training-image based fast rate control method for JPEG2000. By training a set of test images using the PCRD method, the proposed fast method obtains the relationship between the number of coding passes (coding points) and the corresponding number of bytes within a sub-band. The relationship is then approximated by a linear curve. Given a target bit-rate, the fast method can predict the number of coding passes to be included in the final output using the linear model. However the results of the paper show that this method can suffer from a significant PSNR loss (>1 dB in 0.25 bpp). The loss could be much more significant as a single liner function cannot well approximate different kind of images.

Model based rate allocation is an attractive approach for fast rate control as it can provide the optimal quality when the coefficients follow the model assumption. However the major drawback is the degree of model accuracy. It is unlikely that an accurate model can be found for highly varied images. Thus we change our thought into non-model based fast rate control method. JPEG2000, as noted previously, is the new international standard for still image coding. JPEG2000 is based on the discrete wavelet transform (DWT), scalar quantization, coefficient bit modelling, arithmetic coding and rate control. The DWT decomposes an image (or sub-image called tile) into sub-bands for with different level of decomposition. FIG. 1 shows an example of two-level DWT decomposition. The sub-bands consist of coefficients that represent the horizontal and vertical spatial frequency characteristics of the image/tile. Each sub-band is then quantized by a scalar quantizer and divided into non-overlapped rectangular blocks (called code-blocks in JPEG2000) with size typically 64×64 or larger. The quantized code-block data are entropy encoded (compressed) to form a code-block bit-stream. Each of the code-block bit-stream can be truncated to meet the target bit-rate by rate control and finally output to the channel in packet format.

After transformation, the wavelet coefficients are quantized using scalar quantization. Each of the coefficients $a_b(x, y)$ of the sub-band b is quantized to the value $q_b(x,y)$ by $$q_b(x, y) = \text{sign}(a_b(x, y)) \cdot \left\lfloor \frac{|a_b(x, y)|}{\Delta_b} \right\rfloor \quad (1)$$

where $\Delta_b$ is the quantization step size. In lossless compression, the value of $\Delta_b$ must be one for all sub-bands. However, in lossy compression, no particular selection of the quantization step size is required in the standard. One effective way in selecting the quantization step size is to scale a default (or pre-defined) step size $\Delta_d$ by an energy weight parameter $\gamma_b$ [J. W. Woods, J. Naveen, "A Filter Based Bit Allocation Scheme for Subband Compression of HDTV," *IEEE Trans. on Image Processing*, vol. 1, no. 3, pp. 436-440, July 1992.] by $$\Delta_b = \frac{\Delta_d}{\sqrt{\gamma_b}} \quad (2)$$

This selection of quantization step size is recommended in the standard and is implemented in the standard reference software [M. D. Adams and F. Kossentini, "Jasper: A Software-based JPEG-2000 Codec Implementation," *Proc. IEEE Int. Conf On Image Processing*, vol. 2, pp. 53-56, October 2000: M. D. Adams, "Jasper project home page," http://www.ece.uvic.ca/-mdadams/jasper, 2000.] with the default step size $\Delta_d$ equal to two for all sub-bands.

The quantized wavelet coefficients in the code-blocks are encoded using coefficient bit modelling and arithmetic coding. This process is called tier-1 coding in JPEG2000. Tier-1 coding is essentially a bit-plane coding technique that is commonly used in wavelet based image coders [J. M. Shapiro, "Embedded Image Coding using Zerotrees of Wavelet Coefficients," *IEEE Trans. on Signal Processing*, vol. 41, no. 12, pp. 3445-3462, December 1993: A. Said, W. A. Pearlman, "A New, Fast, and Efficient Image Codec Based on Set Partitioning in Hierarchical Trees," *IEEE Trans. on Circuifs and Systems for Video Tech.*, vol. 6, no. 3, pp. 243-250, June 1996.]. In tier-1 coding, code-blocks are encoded independently of one another using exactly the same coding algorithm. For each code-block, coefficients are encoded starting from the most significant bit-plane (MSB) with a non-zero element towards the least significant bit-plane (LSB). Each coefficient bit in a bit-plane is selected to be included in only one of the three coding passes called significance pass, refinement pass and cleanup pass by using coefficient bit modelling. The coding pass data are then arithmetic encoded by a context-based adaptive binary arithmetic coder called MQ coder in JPEG2000.

Rate control in JPEG2000 is achieved partly by the quantization and partly by the selection of the coding pass data to be included in the final output (code-stream). The quantization process as mentioned before roughly controls the rate that is generally far from the target bit-rate and is applied only once. The accurate rate control is achieved by selecting part of the coding pass data to be included in the final code-stream. JPEG2000 has no requirement on which rate control method to be used. However an optimal rate control process called post-compression rate-distortion (PCRD) optimization is recommended in the standard. This process had been described in D. Taubman, "High Performance Scalable Image Compression with EBCOT," *IEEE Trans. on Image Processing*, vol. 9, no. 7, July 2000 clearly and we will summarize it as follow.

Let $\{B_i\}$ i=1, 2 . . . denote the set of all the code-blocks that cover the whole image/tile. For each code-block, an embedded bit-stream is formed by the tier-1 coding with a set of allowable truncation points each of which is located at the end of each coding pass. Thus there is at most three truncation points for each bit-plane. For any code block $B_i$, the bit-stream can be truncated into different discrete length with bit-rate $R_i^1, R_i^2, \ldots$. The corresponding distortion incurred by reconstructing those truncated bit-streams is denoted by $D_i^{n_i}$ at truncation point $n_i$=1, 2, . . . . The optimal rate control process is to select the truncation points which minimize the overall reconstructed image distortion D where $$D = \sum_i D_i^{n_i} \quad (3)$$

subject to the rate constraint $$R = \sum_i R_i^{n_i} \leq R_{budget} \quad (4)$$

where $R_{budget}$ denotes the target bit-rate.

Using the Lagrange multiplier technique [D. Taubman, "High Performance Scalable Image Compression with EBCOT," *IEEE Trans. on Image Processing*, vol. 9, no. 7, July 2000: H. Everett, "Generalized Lagrange Multiplier Method for Solving Problems of Optimum Allocation of Resources," *Oper. Res.*, vol. 11, pp. 399-417, 1963.], the optimization process is equivalent to minimize the cost function $$J = D + \lambda R = \sum_i \left( D_i^{n_i(\lambda)} + \lambda R_i^{n_i(\lambda)} \right) \quad (5)$$

Therefore if we can find a value of λ such that the set of truncation points {n_i(λ)} which minimizes (5) and the maximum achievable rate satisfies the rate constraint in (4) will be the optimal truncation points for a target bit-rate.

A simple algorithm in finding the optimal truncation points is mentioned in Taubman. At any truncation point $n_i$, the R-D "slope" is given by $$S_i^{n_i} \triangleq \frac{\Delta D_i^{n_i}}{\Delta R_i^{n_i}} = \frac{D_i^{n_i-1} - D_i^{n_i}}{R_i^{n_i} - R_i^{n_i-1}} \quad (6)$$

In the rest of the paper, the term R-D slope is always referred to Eqn. (6). Assume $N_i$ be the set of available truncation points for code-block $B_i$. The truncation point $n_i(\lambda)$ for a given value of λ is found such that $$n_i(\lambda) = \max\{j \in N_i | S_i^j \geq \lambda\} \quad (7)$$

where j=1, 2, ... is the truncation point index. However this equation is only true when the R-D slope is monotonically decreasing ($S_i^{n_i,s+1} \leq S_i^{n_i}$) Thus the monotonically decreasing property is assumed in the optimization algorithm. Based on the monotonically decreasing property, the optimal value of λ denoted as $\lambda_{optimal}$ is equal to the minimum value of which satisfies the rate constraint in (4). In practice, an iterative approach with fast convergence is often used in searching the $\lambda_{optimal}$. Once the $\lambda_{optimal}$ is found, the optimal truncation points can be found by (7) with $\lambda = \lambda_{optimal}$.

In the PCRD algorithm, the R-D slope information of all the available truncation points are required to be pre-computed and stored in memory. This requires tier-1 encoding of all the quantized coefficients and the whole encoded bit-stream must be stored in memory even though a large portion of them will not be included in the final output after the optimal truncation. Therefore a significant portion of computational power and working memory size is wasted on computing and storing the unused data. We call this portion of computational power and working memory size to be redundant computational cost and redundant memory usage respectively. Also the PCRD method is a non-causal or off-line process because the entire image/tile needs to be completely encoded before sending out any data and hence long transmission delay is possible. Since the PCRD method requires tier-1 encoding of all the quantized coefficients, the computational complexity can be about 40% to 60% of the total CPU execution time [M. D. Adams and F. Kossentini, "Jasper: A Software-based JPEG-2000 Codec Implementation," *Proc. IEEE Int. Conf On Image Processing*, vol. 2, pp. 53-56, October 2000: K. F. Chen, C. J. Lian, H. H. Chen and L. G. Chen, "Analysis and Architecture Design of EBCOT for JPEG-2000," Proc. *IEEE Int. Sym. of Circuits and Systems*, vol. 2, pp. 765-768, May 2001.]

SUMMARY OF THE PRESENT INVENTION

According to broad aspects of the present invention there are provided three novel fast rate control methods that can efficiently reduce or remove the computation and memory usage redundancy over the conventional PCRD method. The first method, called successive bit-plane rate allocation (SBRA), assigns the maximum allowable bit-rate for each bit-plane of each code-block by using the currently available rate-distortion information only. The second method is called priority scanning rate allocation (PSRA). This first predicts the order of magnitude of each truncation point's rate-distortion slope and then encodes the truncation points based on the order (priority) information. The third method uses PSRA to obtain a significantly smaller amount of data than PCRD for optimal truncation and is called priority scanning with optimal truncation (PSOT).

In a comparison of the three methods, SBRA provides the highest computational complexity and memory usage reduction, and the lowest coding/transmission delay. The computational complexity reduction can be up to about 90% of the entropy coding process. However this method gives the lowest PSNR performance of the three. PSRA provides higher PSNR performance than SBRA with the penalty of lower memory usage reduction and higher delay. PSOT provides the best (optimal) quality while it is the least efficient method in term of computational complexity, memory usage and the coding/transmission delay. The three methods provide different degree of computation complexity and memory reduction, coding/transmission delay and PSNR performance. The most suitable rate control method can be chosen based on application requirements.

BRIEF DESCRIPTION OF THE FIGURES

Some embodiments of the invention will now be described for the sake of example only with reference to the following figures, in which.

DETAILED DESCRIPTION OF PREFERRED EMBODIMENTS

Figure 1:
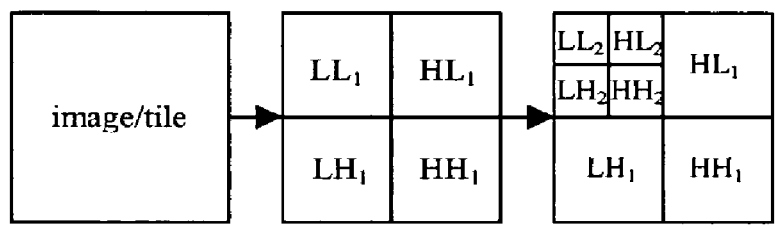
FIG. 1 illustrates an example of a two-level digital wavelet decomposition into subbands, FIG. 2. shows a plot of R-D ratio curve of first code-block for test image 'Lena'.

The present invention seeks to provide new and useful rate control techniques for JPEG2000 image coding in particular and other forms of data coding in general.

A first aspect of the present invention ("successive bit-plane rate allocation" or "SBRA") proposes that, in the determination of whether or not to include a coding pass in the final code-stream, a rate-distortion value (R-D value) is computed and compared with an adaptive threshold. if tine R-D ratio is larger than or equal to a threshold, the coding pass would be included. This is a causal method which can make the decision immediately, without waiting for future code-blocks to be processed or encoded.

PCRD incurs significant encoding delay because it selects the truncation points only after the complete tier-1 encoding of all the code-blocks. For a real-time, low delay rate control process, it is desirable that the compressed data of the early code-blocks can be sent out before the later code-blocks are being encoded. The ideal way to do this is to select the truncation point of a code-block in a casual manner, in parallel with the tier-1 coding. This can also eliminate the redundant computation and memory usage. However, without knowing the actual R-D slopes of the data, it is impossible to find the optimal truncation point. So, instead of finding the optimal truncation point, we propose to find a good truncation point which is close to the optimal point in parallel with the tier-1 coding.

Recall that the optimal truncation point for any code-block $B_i$ is found by Eqn. (7) with $\lambda=\lambda_{optimal}$. Eqn. (7) requires that the R-D slope at all allowable truncation points to be pre-computed. However, in a causal rate control process, code-blocks are encoded one after another. When the code-block $B_i$ is being encoded, all the R-D slope information of the future code-blocks $\{B_j\}_{j>i}$ is unknown. Thus the $\lambda_{optimal}$ cannot be determined.

Instead of finding the $\lambda_{optimal}$ an approximation approach will be used here in order to obtain a causal rate control process which can be done in parallel with the tier-1 coding. We note that the condition $S_i^j \geq \lambda$ from Eqn. (7) and becomes $$S_i^{n_i} \frac{\Delta D^{n_i}}{\Delta R_i^{n_i}} = \frac{D_i^{n_i-1} - D_i^{n_i}}{R_i^{n_i} - R_i^{n_i-1}} \geq \lambda_{optimal} \tag{8}$$

$$A_i^{n_i-1} = \frac{D_i^{n_i-1}}{\Delta R_i^{n_i}} \geq \lambda_{optimal} \frac{D^{n_i}}{\Delta R_i^{n_i}} \tag{9}$$

$$A_i^{n_i-1} \geq \alpha_i^{n_i} \tag{10}$$

Now the condition $S_i^{n_i} \geq \lambda_{optimal}$ becomes $A_i^{n_i-1} \geq \alpha_i^{n_i}$ in the optimal case and the term $A_i^{n_i-1}$ is called R-D ratio. There are two approximations in Eqn. (10). The first approximation is that the R-D slope at a current truncation point $n_i$ is approximated by the R-D ratio of previous truncation point $n_i-1$. The second approximation is that the constant $\lambda_{optimal}$ is now approximated by a variable $\alpha_i^{n_i}$ for different code-blocks and truncation points. As we do not know the $\lambda_{optimal}$, the optimal value of $\alpha_i^{n_i}$ cannot be found too. However we are not going to find the optimal truncation points. A good value of $\alpha_i^{n_i}$ can be simply found by using the rate constraint in Eqn. (4).

Let the $i^{th}$ code-block $B_i$ be the code-block currently being encoded. Then $\{B_j\}_{j<i}$ is the set of previously encoded code-blocks with corresponding truncation point $\{n_j\}_{n<i}$ and $\{B_j\}_{j>i}$ is the set of future code-blocks. We denote $\{B_j\}_{j<i}$ and $\{B_j\}_{j>i}$ as $B_c$ and $B_u$ respectively. For the current code-block we further assume that the coefficients at and before an allowable truncation point c have been encoded such that at the final truncation point will satisfy $n_i \geq c$. This implies $R_i^{n_i} \geq R_i^c$. We then define $D_{remain}$ and $R_{remain}$ as $$D_{remain} = D_i^c + \sum_{k \in B_u} D_k^0 \tag{11}$$

and $$R_{remain} = R_{budget} - R_i^c - \sum_{k \in B_c} R_k^{n_k} \geq 0 \tag{12}$$

Using Eqn. (12), the rate constraint in Eqn. (4) can be rewritten as $$R_i^{n_i} - R_i^{c_i} + \sum_{k \in B_u} R_k^{n_k} \leq R_{remain} \tag{13}$$

By summing over current and all uncoded code-blocks, the condition in Eqn. (10) becomes $$D_i^c + \sum_{k \in B_u} D_k^0 \geq \alpha_i^{n_i}(R_i^{n_i} - R_i^c) + \sum_{k \in B_u} \alpha_k^{n_k}(R_k^{n_k} - R_k^0) \tag{14}$$

where $R_k^0$ is the rate that the bit-stream is totally truncated. So its value is zero. As the R-D ratio $A_i^{n_i-1}$ is used to approximate the R-D slope $S_i^{n_i}$ in Eqn. (10), we can assume that the term $D_i^{n_i}/\Delta R_i^{n_i}$ in Eqn. (9) is constant in the sense that all the code-block bit-streams are truncated at the same R-D ratio. This also assumes that $\alpha_i^{n_i}$ is constant. The equation in Eqn. (14) then becomes $$D_i^c + \sum_{k \in B_u} D_k^0 \geq \alpha_i^{n_i}\left(R_i^{n_i} - R_i^c + \sum_{k \in B_u} R_k^{n_k}\right) \tag{15}$$

$$D_{remain} \geq \alpha_i^{n_i} R_{remain} \tag{16}$$

$$\alpha_i^{n_1} \leq \frac{D_{remain}}{R_{remain}} \tag{17}$$

Using Eqn. (11) and Eqn. (13), it can be shown that $\alpha_i^{n_i}$ is bounded by $D_{remain}/R_{remain}$. For $D_{remain}/R_{remain} \geq 1$ and Eqn. (17) can be re-written to an unbounded form as $$\alpha_i^{n_i} = \frac{D_{remain}}{R_{remain}} \cdot \frac{1}{\beta_i^{n_i}}, \forall \beta_i^{n_i} \geq 1 \tag{18}$$

where $\beta_i^{n_i}$ is a weighting factor. As the $D_{remain}/R_{remain}$ will change for different truncation points, $\alpha_i^{n_i}$ is eventually required to be updated for each truncation point. Finally we have found the equation in calculating the value of $\alpha_i^{n_i}$ and the condition in Eqn. (10) becomes $$A_i^{n_i-1} = \frac{D_i^{n_i-1}}{\Delta R_i^{n_i}} \geq \frac{D_{remain}}{R_{remain}} \cdot \frac{1}{\beta_i^{n_i}} \tag{19}$$

Before actually encoding the sample data in-between the truncation points $n_i$ and $n_i-1$, the only unknown is $R_i^{n_i}$ in Eqn. (19). Thus a maximum allowable rate different for truncation point $n_i$ can be computed such that $$\max \Delta R_i^{n_i} = \beta_i^{n_i} \cdot D_i^{n_i-1} \cdot \frac{D_{remain}}{R_{remain}} \tag{20}$$

Tier-1 coding of code-block A will be stopped when $$\Delta R_i^{n_i} \geq \max \Delta R_i^{n_i} \tag{21}$$

In other words, the bit-stream of code-block $B_i$ is truncated at truncation point $n_i$ when the condition in Eqn. (21) is satisfied.

Figure 2:
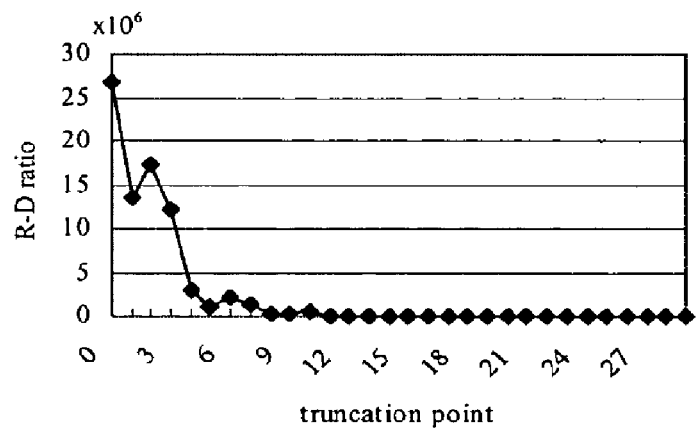

It should be noted that this approximation approach has assumed that the RDratio is monotonically decreasing ($A_i^{n_i+1} \leq A_i^{n_i}$) However, in real situations, the R-D ratios evaluated at coding pass boundaries do not always follow the monotonically decreasing property. FIG. 2 shows the real R-D ratio curve of the first code-block for test image 'Lena'. In order to have a better approximation, the R-D ratios may be evaluated at bit-plane boundaries because the distortion different between two consecutive bit-planes is larger than that between two consecutive coding passes. Thus the R-D ratios evaluated at bit-plane boundaries can follow the monotonically decreasing property much often than those evaluated at coding passes boundaries. In the standard, the bit-plane boundaries are defined at $n_i=1, 4, 7, 10, \ldots$. Let $b_i=1, 2, 3, \ldots$ denotes the bit-plane truncation points for code-block $B_i$ such that $b_i=3 \cdot \lceil n_i/3 \rceil 2$ Then the stopping criterion in Eqn. (21) becomes $$R_i^{n_i} - R_i^{b_i} \geq \max \Delta R_i^{b_i} \qquad (23)$$

where $$\max \Delta R_i^{b_i} = \beta_i^{b_i} \cdot D_i^{p_i} \cdot \frac{D_{remain}}{R_{remain}}, \qquad (24)$$

$$p_i \begin{cases} b_i - 1 & b_i < 3 \\ b_i - 3 & \text{otherwise} \end{cases}$$

Eqn. (23) and Eqn. (24) will be used in this embodiment and can be referred to as successive bit-plane rate allocation (SBRA). A simple form of the SBRA method is to ignore the weighting factors $\beta_i^{b_i}$ such that they are all set to one. This non-weighted method is called SBRA-I. However different weighting factors other than one can be used. This weighted method may be called SBRA-w.

As the SBRA method requires only the currently available R-D information and information relating to the previously encoded data can be forgotten, this method can provide both memoryless and casual features. The encoded code-block data can be sent out immediately.

A. Linear Rate Regulation

Figure 3:
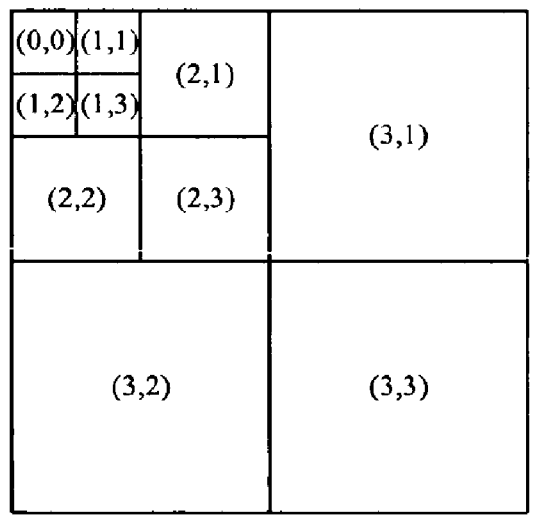
FIG. 3 shows the indexing of subbands. Each subband is indexed by a resolution level and an orientation (r,θ). This example shows a three level DWT decomposition.

The term $\beta_i^{b_i}$ in Eqn. (24) is used to reduce or correct the rate allocation error between the PCRD and SBRA method. The, $\beta_i^{b_i}$ is defined for each bit-plane j and code-block i. However it is known that the image frequency characteristics are the same with a subband. Thus a simple weighting factor defined for each subband is often sufficient. The term $\beta_i^{b_i}$ is then re-indexed to be, $\beta_{r,\theta}$ where r is the resolution level and $\theta$ is the orientation which are indexed as shown in FIG. 3.

Figure 4:
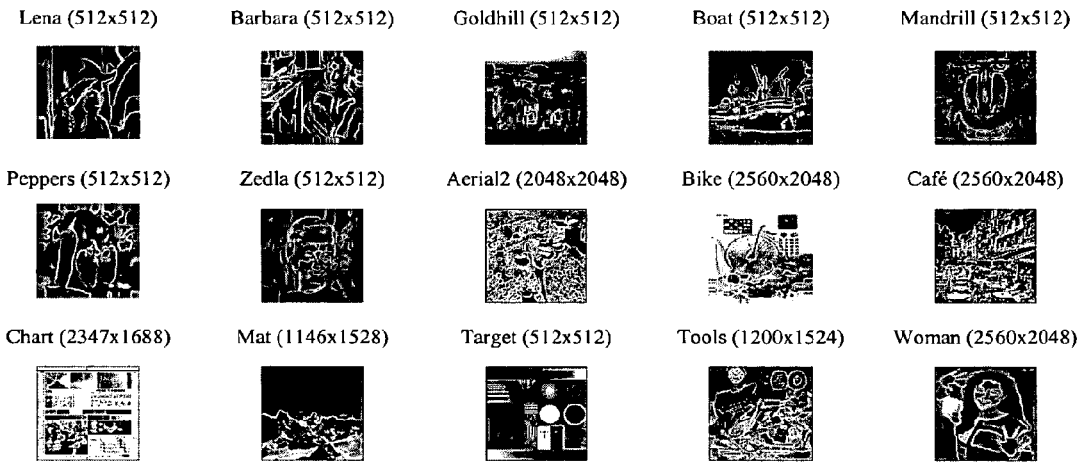
FIG. 4 shows selected test images.
Figure 5:
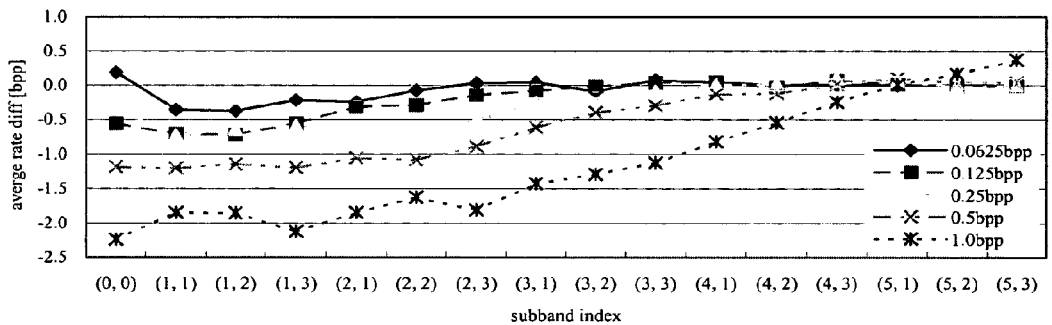
FIG. 5 shows the average rate difference between PCRD and SBRA-1 (PCRD-SBRA-1) for sixteen subbands at different target bit-rates.
Figure 6:
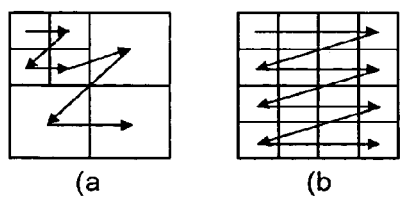
FIG. 6 shows the scan order of (a) subband and (b) code block within a subband.

In this modelling method, the rate profile of each subband is first examined using both the PCRD and SBRA-1 method for the fifteen test images shown in FIG. 4. The rates are measured in term of bit per pixel (bpp) and the average rate difference between PCRD and SBRA-1 is plotted in FIG. 5. It can be seen that SBRA-I allocates fewer rates at lower resolution subbands and the rate allocation difference is approximately linear decreasing from low to high resolution subbands. The rate allocation difference can be approximated by a linear curve with slope related to target bit-rate. As the weighting factor in (24) directly controls the maximum allowable rate for a given bit-plane, a larger weighting factor can be used to increase the total bit-rate allocated for a given code-block. In other words, it is possible to have a later truncation point than 20 that in SBRA-1. It may then be assume that the weighting factor is proportional to the achieved bit-rate for a given code-block. Thus one can model $\beta_{r,\theta}$ by a linear equation such that $$\beta_{r,\theta} = 1 + m \cdot k_{r,\theta} \qquad (25)$$

and $$k_{r,\theta} = \begin{cases} M - 1 & \text{for } (r, \theta) = (0, 0) \\ M - 3 \cdot (r - 1) - \theta - 1 & \text{otherwise} \end{cases} \qquad (26)$$

where m is the slope of the linear curve. M is the total number of subbands and $(r,\theta)$ is indexed as shown in FIG. 3. This weighting model is called linear rate regulation. Here it is assumed that the linear model is applied for the coding order as shown in FIG. 6.

Figure 7:
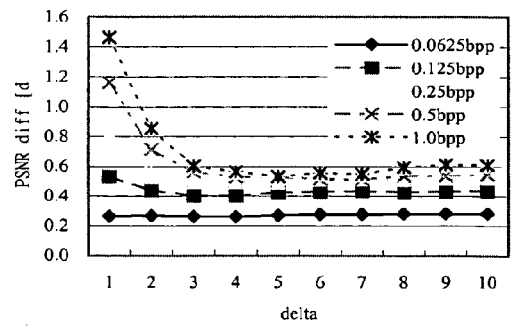
FIG. 7 shows the average PSNR difference between PCRD and SBRA-w (PCRD-SBRA-w) for different values of Δ at different target bit rates.

In general, m is dependent on image characteristics and target bit-rate. However a close form relationship between the m and image characteristics may require a complicated image analysis process. Thus model m as $$m = R_{budget}/\Delta \qquad (27)$$

where $\Delta$ is a pre-defined constant and $R_{budget}$ is the target bit-rate in term of bpp. The constant $\Delta$ is chosen by an image-training method and the PSNR performance is the main criterion in finding the value of $\Delta$. As a five-level DWT decomposition is used in all simulations/implementation, the value of $\Delta$ for that configuration may be found. FIG. 7 shows the relationship between the values of $\Delta$ and average PSNR performance of SBRA-w using the test images as shown in FIG. 4. This shows that the difference of the PSNR performance is less than 0.1 dB in-between the values of three and ten and the value of five gives a relatively good result among them. Thus the value of $\Delta$ as five may be used in this embodiment.

B. Implementation

It should be noted that the coding could be stopped when max $\Delta R_i^{b_i}$ in Eqn. (24) is small enough before actually encoding the coding pass. In other words, it is possible to early terminate the tier-1 coding process of a code block when $$\max \Delta R_i^{b_i} \leq T \qquad (28)$$

In practical implementations, max $\Delta R_i^{b_i}$, is preferably rounded to nearest integer and the threshold T is set to zero because this is the simplest value that gives almost the highest PSNR performance.

Figure 8:
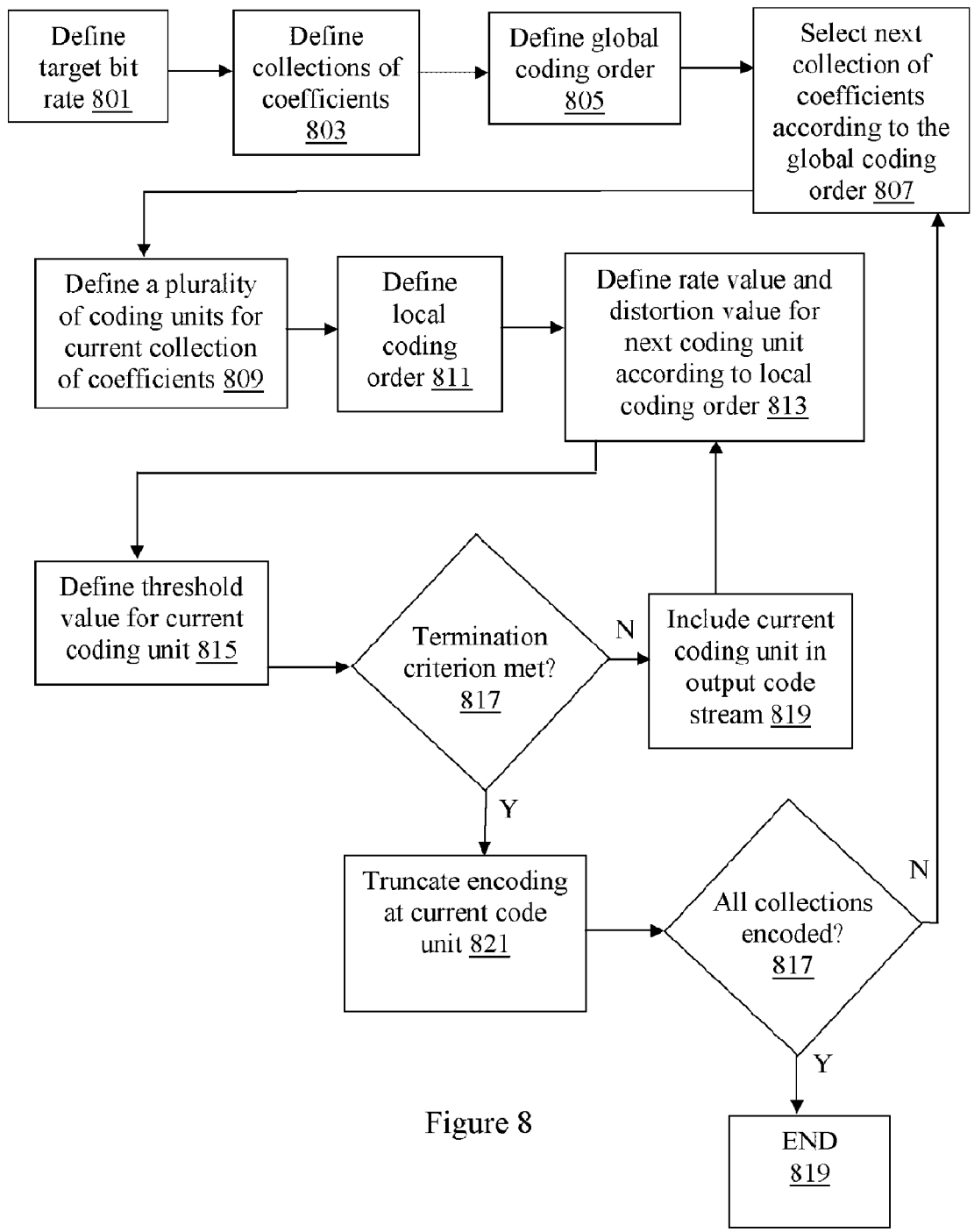
FIG. 8 depicts a flow chart describing successive bit-plane rate allocation (SBRA) in accordance with embodiments.

FIG. 8 depicts a flow chart describing successive bit-plane rate allocation (SBRA) in accordance with embodiments. First, a target bit rate may be defined block 801. Collections of coefficients of source data may be defined block 803. A global coding order used to code the collections of coefficients may be defined block 805. Initially, a first collection of coefficients may be selected according to the global coding order block 807. As will be noted below, once the first and any subsequent collections of coefficients are selected, the next collection of coefficients may be selected according to the global coding order block 807. Once a next collection of coefficients is selected, a plurality of coding units for the current collection of coefficients may be defined block 809. A local coding order which may be used to code the plurality of coding units may be defined block 811. For each coding unit according to the local coding order, a rate value and a distortion value may be defined as described elsewhere within this specification block 813. A threshold value for the current coding unit may be defined as described elsewhere within this specification block 815. Next, if a termination criterion is not met as described elsewhere within this specification, the current coding unit may be included in the output code stream, block 819, and a next coding unit may be processed as described elsewhere within this specification. If the termination criterion is met as described elsewhere within this specification, the coding of the collection of coefficients may be truncated at the current coding unit block 821. If no further collections of coefficients remain to be encoded, then the process may end block 819. If more collections of coefficients remain, block 817, then a next collection of coefficients may be selected for encoding and the process may continue until there are no more collections of coefficients to encode.

A second aspect of the invention ("Priority Scanning Rate Allocation", or "PSRA) proposes to establish a priority level of each coding unit of each code-block. All the coding units of all code-blocks are then scanned and encoded according to the priority level, starting from the highest priority level towards the lowest.

By examining the PCRD scheme, it can be seen that if the R-D slopes of all the allowable truncation point $n_i$ are sorted in descending order and the order is kept in a sorted list, the optimal rate allocation can also be achieved by encoding the truncation point from the top of the sorted list according to the sorted order. This leads to an interesting observation that, once the order is known, it is not necessary to know the actual value of the R-D slope. The problem now becomes how to obtain the order without knowing all the values of the R-D slopes.

It is unlikely that the actual order list can be obtained without knowing the actual R-D information. Instead the order may be predicted based on an assumption. Based on the assumed monotonically decreasing property of R-D slope function, an earlier truncation point will have larger R-D slope than later truncation point within a code-block. This property can be extended to the whole image such that an earlier truncation point of any code-block is assumed to have a larger R-D slope than later truncation points of other code-block(s).

By this assumption, the coding priority (order) is set based on the truncation point level within an image. The coding pass with the higher priority will be tier-1 encoded first followed by coding passes with lower priority. The proposed method is called priority scanning rate allocation (PSRA) and is performed as follows:

1. Initialization

For the $i^{th}$ code block B, the initial code-block priority is equal to the maximum number of coding passes required to fully encode the data in the code-block and is calculated by $$P_i = 3 * j_i^0 - 2 \tag{29}$$

where $j_i^0$ is the maximum number of bit-plane level required to fully encode the data in the code-block. The current coding priority is defined as $$P_c = \max_i (P_i) \tag{30}$$

2. Priority Scanning

Visit each code-block according to the scan order as shown in FIG. 6. For each code-block $B_i$, condition C1 is checked.

C1: If the code-block priority is equal to the current coding priority ($P_i = P_c$), encode the first unencoded coding pass of $B_i$, reduce $P_i$ by one, calculate the R-D slope by Eqn. 4 and check the condition C2. Else check the condition C3.

C2: If the accumulated bit-rate is larger than the target bit-rate, find and discard the encoded coding pass(es) which has the minimum R-D slope(s) such that the accumulated bit-rate is less than or equal to the target bit-rate. The whole tier-1 coding process will be terminated at this point. Else check the condition C3.

C3: If the code-block is the last one in the scan order, reduce $P_c$ by one and the next code-block will be the first one in the scan order. Else visit the following code block.

The code-block priority in Eqn. (20) determines the truncation point level to be processed in the current round within an image. It exploits the assumption that the highest truncation point level has the highest R-D slope within an image. The current coding priority function in Eqn. (30) is just an indication to indicate what priority will be included in the current scanning. Based on the actual R-D functions, the discard of the included coding pass in the condition C2 can maximize the PSNR performance of this method.

The PSNR performance of PSRA might be degraded when the coefficients do not follow the assumption. However experimental results show that PSRA can have good PSNR performance for most test images. Different from SBRA, the encoded code-block data in PSRA can only be sent out after the whole PSRA process is finished.

A third aspect of the invention ("Priority Scanning with Optimal Truncation", or "PSOT") proposes establishing a priority level of each coding unit of each code-block. All the coding units of all code-blocks are then scanned and encoded according to the priority level, starting from the highest priority level towards the lowest. When sufficient coding levels of the code-blocks are encoded, rate-distortion optimized allocation is applied.

The PCRD method achieves the best visual quality but is not the most efficient of the three methods because it requires encoding the whole set of the allowable truncation points. Compared with PCRD, PSRA encodes a significantly smaller set of truncation points but the visual quality is less than optimal. Here a new method called Priority Scanning with Optimal Truncation (PSOT) is proposed and which is able to achieve optimal visual quality similar to PCRD, and computational complexity similar to PSRA.

First, the PSRA method is used to estimate a R-D slope that could be close to the optimal $\lambda$. Then a minimum slope rejection method is used to terminate the tier-1 coding process of each code block such that the last calculated R-D slope of each code block is less than or equal to the estimated R-D slope. Finally, PCRD is applied to the encoded truncation points. By doing so, instead of encoding all truncation points, only a smaller amount of truncation points are required to be encoded. This proposed scheme is called priority scanning with optimal truncation (PSOT) and is performed as follows:

1. Initialization & Priority Scanning

Perform PSRA as in Section IV. However, instead of termination, if the accumulated bit rate is larger than the target bit rate, go to step 2.

2. Minimum Slope Rejection

Find the minimum rate-distortion slope $S_{min}$ among the calculated R-D slopes in step 1. Visit each of the code-blocks and continue the Tier-1 encoding until the code block's minimum rate-distortion slope is less than or equal to the $S_{min}$.

3. Optimal Truncation

This step is essentially the PCRD method. The optimal $\lambda$ is found among the encoded truncation points. Then the truncation points with rate-distortion slope greater than or equal to the optimal $\lambda$ are included in the final code-stream.

If the $S_{min}$ is less than or equal to the optimal $\lambda$, the proposed method will have the same PSNR performance as the conventional PCRD scheme in JPEG2000. Same as PSRA, the encoded code-block data can only be sent out after the whole PSOT process has been finished.

The embodiments of the invention described above are in terms of JPEG2000 image coding. The code-block can be of any shape (e.g. square or rectangular). The blocks may or may not be overlapping. Furthermore, it is not necessary to follow the coding order of the code-blocks in JPEG2000, and it is not necessary to define the coding passes as the significance pass, refinement pass and cleanup pass of JPEG2000. Other coding passes are possible, including embedded zero-tree wavelet coding, or those of SPHIT, etc. Furthermore, it is not necessary to use discrete wavelet transform. Other transforms such as discrete cosine transform, discrete Fourier transform, Hadamard tranform, Slant transform, etc. are possible.

For the images, one picture element may have one or more components such as the luminance component, the red, green, blue (RGB) components, the YUV components, the YCrCb components, the infra-red components, the X-ray or other components. Each component of a picture element is a number, which may be a natural number, an integer, a real number or even a complex number. In the case of natural numbers, they may be 12-bit, 8-bit, or any other bit resolution.

Moreover, the present invention in any of its aspects is applicable not only to the encoding of images, but also to the rate control or rate allocation in the encoding of audio signals, speech signals, video signals, seismic signals, medical signals, etc.

The fast rate control process is mainly targeted for fast, low-delay and low cost software and hardware implementations of JPEG2000. Possible applications include digital camera, digital camcorder, personal digital assistant (PDA), multimedia-enabled cellular phones (2.5G, 3G, and beyond), wireless LAN devices, Bluetooth applications, web servers, internet applications, scanners, remote sensing, etc. In digital cameras, delay is very important. People often complain that, after depressing the button, the camera would take a long time to capture and store the image. This is becoming an increasing important problem as the digital images are getting bigger and bigger. Nowadays, some cameras have 5 mega pixels (about 2560×1920 pixels) or more, which would require a significant amount of time to encode. The proposed algorithm can reduce the time to store the image because It reduces significantly the time to convert the image into the JPEG2000 format (by about 40%). The camera can be ready to take another picture much sooner. In additional, our algorithm requires much lesser memory than PCRD so that cache memory requirement in hardware can be reduced and the implementation cost can be reduced. Nowadays, many digital video (DV) camcorders include still image capture capability. They would store the captured image in a separate storage media such as multimedia card, or SD, etc. Users would experience similar complaints as they do in digital cameras, namely, a long delay in storing the images resulting in long interval between consecutive image shots. Again the proposed algorithm can reduce the delay significantly. Similarly, many PDAs, cellular phones, wireless LAN and Bluetooth devices, and notebook computers are increasing having video/image capture capability built-in or in add-on devices. A long delay in storing images would always result in long interval between consecutive image shots, and the proposed algorithm can reduce the delay.

The invention claimed is:

1. A method, comprising:
    examining, by a computing device, respective collections of coefficients out of a plurality of collections of coefficients according to a global coding order of the plurality of collections of coefficients, the respective collections of coefficients having respective priority levels as well as respective pluralities of coding units and truncation points which correspond to the coding units;
    in response to determining that an examined collection of coefficients out of the plurality of collections of coefficients has a priority level equal to a global priority level, encoding, by the computing device, a first un-encoded coding unit according to a local coding order of the collection of coefficients and reducing the priority level of the collection of coefficients; and
    after each of the collections of coefficients in the plurality are examined, decreasing, by the computing device, the global priority level;
    repeating the examining, the encoding, the reducing and the decreasing, by the computing device, for the plurality of collections of coefficients; and
    terminating the examining, the encoding, the reducing, and the decreasing, by the computing device, in response to determining that a total amount of bits used is greater than a target bit rate.

2. The method of claim 1 further comprising removing, by the computing device, one or more last coding units encoded before the total amount of bits used exceeded the target bit rate from an output code-stream.

3. The method of claim 1 further comprising terminating, by the computing device, the examining, the encoding, the reducing, and the decreasing in response to determining that all details of each of the collections of coefficients have been encoded.

4. The method as claimed in claim 1 wherein said collections of coefficients are code-blocks of coefficients in a data transform domain.

5. The method of claim 1, further comprising:
    removing, by the computing device, an encoded coding unit with a least rate-distortion slope; and
    repeating the removing, by the computing device, with a next coding unit with a next least rate-distortion slope until the total amount of bits used is less than or equal to the target bit rate.

6. An article of manufacture including a computer-readable medium having instructions stored thereon that, in response to execution by a computing non-transitory device, cause the computing device to perform operations comprising:
    examining respective collections of coefficients out of a plurality of collections of coefficients according to a global coding order of the plurality of collections of coefficients, the respective collections of coefficients having respective priority levels as well as respective pluralities of coding units and truncation points which correspond to the coding units;
    in response to determining that an examined collection of coefficients out of the plurality of collections of coefficients has a priority level equal to a global priority level, encoding a first un-encoded coding unit according to a local coding order of the collection of coefficients and reducing the priority level of the collection of coefficients; and
    after each of the collections of coefficients in the plurality are examined, decreasing the global priority level;
    repeating the examining, the encoding, the reducing and the decreasing for the plurality of collections of coefficients; and
    terminating the examining, the encoding, the reducing, and the decreasing in response to determining that a total amount of bits used is greater than a target bit rate.

7. The article of manufacture of claim 6, wherein the operations further comprise removing one or more last coding units encoded before the total amount of bits used exceeded the target bit rate from an output code-stream.

8. The article of manufacture of claim 6 wherein the operations further comprises terminating the examining, the encoding, the reducing, and the decreasing in response to determining that all details of all the collections of coefficients have been encoded.

9. The article of manufacture of claim 6 wherein the collections of coefficients are code-blocks of coefficients in a data transform domain.

10. The article of manufacture of claim 6, wherein the operations further comprises:
   removing an encoded coding unit with a least rate-distortion slope; and
   repeating the removing with a next coding unit with a next least rate-distortion slope until the total amount of bits used is less than or equal to the target bit rate.

11. The article of manufacture of claim 6 in which the respective priority levels of the collections of coefficients are respectively equal to a total number of coding units used to specify the respective collections of coefficients.

12. The article of manufacture of claim 6 in which the collections of coefficients are code-blocks of coefficients in a discrete wavelet transform domain of an image or image tile, and the coding unit is a significance pass, refinement pass or cleanup pass of JPEG2000.

13. The article of manufacture of claim 6 in which the respective priority levels of the collections of coefficients are respectively linear functions of a total number of bit planes used to describe wavelet coefficients.

14. An apparatus, comprising:
   means for examining respective collections of coefficients out of a plurality of collections of coefficients according to a global coding order of the plurality of collections of coefficients, the respective collections of coefficients having respective priority levels as well as respective pluralities of coding units and truncation points which correspond to the coding units;
   means for, in response to determining that an examined collection of coefficients out of the plurality of collections of coefficients has a priority level equal to a global priority level, encoding a first un-encoded coding unit according to a local coding order of the collection of coefficients and reducing the priority level of the collection of coefficients; and
   means for, after each of the collections of coefficients in the plurality are examined, decreasing the global priority level;
   means for repeating the examining, the encoding, the reducing and the decreasing for the plurality of collections of coefficients; and
   means for terminating the examining, the encoding, the reducing, and the decreasing in response to determining that a total amount of bits used is greater than a target bit rate.

15. The apparatus of claim 14 further comprising means for removing one or more last coding units encoded before the total amount of bits used exceeded the target bit rate from an output code-stream.

16. The apparatus of claim 14 further comprising means for terminating the examining, the encoding, the reducing, and the decreasing in response to determining that all details of all the collections of coefficients have been encoded.

17. The apparatus of claim 14 wherein said collections of coefficients are code-blocks of coefficients in a data transform domain.

18. The apparatus of claim 14, further comprising:
   means for removing an encoded coding unit with a least rate-distortion slope; and
   repeating the removing with a next coding unit with a next least rate-distortion slope until the total amount of bits used is less than or equal to the target bit rate.

19. The apparatus of claim 14 in which the respective priority levels of the collections of coefficients are respectively equal to a total number of coding units used to specify the respective collections of coefficients.

20. The apparatus of claim 14 in which the collections of coefficients are code-blocks of coefficients in a discrete wavelet transform domain of an image or image tile, and the coding unit is a significance pass, refinement pass or cleanup pass of JPEG2000.

21. The apparatus of claim 14 in which the respective priority levels of the collections of coefficients are respectively linear functions of a total number of bit planes used to describe wavelet coefficients.

* * * * *

UNITED STATES PATENT AND TRADEMARK OFFICE
CERTIFICATE OF CORRECTION

PATENT NO.        : 7,970,224 B2
APPLICATION NO.   : 12/638225
DATED             : June 28, 2011
INVENTOR(S)       : Yeung et al.

It is certified that error appears in the above-identified patent and that said Letters Patent is hereby corrected as shown below:

On Title Page 2, item (56), under "Other Publications", Line 10, delete "Codying" and insert -- Coding --.

Column 14, lines 36-37, in Claim 6, delete "computer-readable medium" and insert -- computer-readable non-transitory medium --.

Column 14, line 38, in Claim 6, delete "non-transitory device," and insert -- device, --.

Column 15, line 8, in Claim 10, delete "comprises:" and insert -- comprise: --.

Signed and Sealed this
Eighth Day of November, 2011

David J. Kappos
*Director of the United States Patent and Trademark Office*